United States Patent
Thubert et al.

(10) Patent No.: US 10,027,581 B2
(45) Date of Patent: Jul. 17, 2018

(54) ROUTING TRAFFIC OVER CHAOTIC NETWORKS

(71) Applicant: Cisco Technology, Inc., San Jose, CA (US)

(72) Inventors: Pascal Thubert, La Colle sur Loup (FR); Patrick Wetterwald, Mouans Sartoux (FR); Jean-Philippe Vasseur, Saint Martin d'uriage (FR); Eric Levy-Abegnoli, Valbonne (FR)

(73) Assignee: Cisco Technology, inc., San Jose, CA (US)

( * ) Notice: Subject to any disclaimer, the term of this patent is extended or adjusted under 35 U.S.C. 154(b) by 254 days.

(21) Appl. No.: 14/886,352

(22) Filed: Oct. 19, 2015

(65) Prior Publication Data

US 2017/0111271 A1    Apr. 20, 2017

(51) Int. Cl.
| | |
|---|---|
| *H04L 12/28* | (2006.01) |
| *H04L 12/721* | (2013.01) |
| *H04L 12/823* | (2013.01) |
| *H04L 12/801* | (2013.01) |
| *H04W 40/24* | (2009.01) |

(52) U.S. Cl.
CPC ............ *H04L 45/70* (2013.01); *H04L 47/14* (2013.01); *H04L 47/32* (2013.01); *H04W 40/24* (2013.01)

(58) Field of Classification Search
None
See application file for complete search history.

(56) References Cited

U.S. PATENT DOCUMENTS

| | | | |
|---|---|---|---|
| 7,957,737 B2 | 6/2011 | Lee | |
| 8,165,040 B2 | 4/2012 | Yang et al. | |
| 8,737,268 B2 | 5/2014 | Jetcheva et al. | |
| 8,825,052 B2 | 9/2014 | Mach et al. | |
| 2009/0141667 A1* | 6/2009 | Jin | H04B 7/2606 370/315 |
| 2013/0136019 A1* | 5/2013 | Fujimoto | H04W 24/02 370/252 |
| 2013/0188562 A1* | 7/2013 | Espina Perez | H04L 1/188 370/328 |
| 2015/0163720 A1* | 6/2015 | Cordeiro De Oliveria Barros | H04W 40/20 370/254 |

(Continued)

OTHER PUBLICATIONS

Angelakis, et al., "Chapter 8: Probabilistic Routing Schemes for Ad-Hoc Opportunistic Networks", Routing in Opportunistic Networks, 2013, 19 pages, Springer, New York.

(Continued)

*Primary Examiner* — Jutai Kao
(74) *Attorney, Agent, or Firm* — Park Ibrahim & Berg LLP; James M. Behmke; Stephen D. LeBarron

(57) ABSTRACT

In one embodiment, a device in a network receives packet arrival information for a packet from a neighbor of the device in the network. The packet arrival information indicates a likelihood of the packet being received by a target node that is moving in the network were the packet forwarded by the neighbor to the target node. The device forwards the packet to the target node based on a determination that the device has a higher likelihood of the packet being received by target node were the packet forwarded by the device to the target node than were the packet forwarded by the neighbor to the target node.

20 Claims, 17 Drawing Sheets

(56) References Cited

U.S. PATENT DOCUMENTS

2017/0019828 A1\* 1/2017 Purohit ................ H04W 40/02
2017/0201926 A1\* 7/2017 Krendzel ............. H04W 40/20

OTHER PUBLICATIONS

Agarwal, et al., "Enhancing Greedy Routing Using Fuzzy Logic for Vehicular Ad Hoc Networks", Proceedings of the International Conference on Advances in Computing, Control and Networking—ACCN 2015, 5 pages, Institute of Research Engineers and Doctors, USA.

Leão, et al., "FLBRA: Fuzzy Logic Based Routing Algorithm for Indoor Wireless Sensor Networks", International Journal of Computer Science and Information Technology (IJCSIT), vol. 6, No. 5, Oct. 2014, pp. 85-96.

\* cited by examiner

ROUTING TRAFFIC OVER CHAOTIC NETWORKS

TECHNICAL FIELD

The present disclosure relates generally to computer networks, and, more particularly, to routing traffic over chaotic networks.

BACKGROUND

Mesh networks have become increasingly popular and practical in recent years. In particular, shared-media mesh networks, such as wireless or Powerline Communication (PLC) networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network, which may be the public Internet and/or a private network.

In contrast to traditional networks, LLNs and other mesh networks can appear chaotic due to the mobility of LLN nodes. For example, an LLN may include mobile phones, motor vehicles, and other nodes that are constantly in motion. Thus, at any given time, a node A attempting to communicate with a node B may be unable to do so (e.g., because A cannot move to B, because A has other tasks that prevent it from reaching B, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
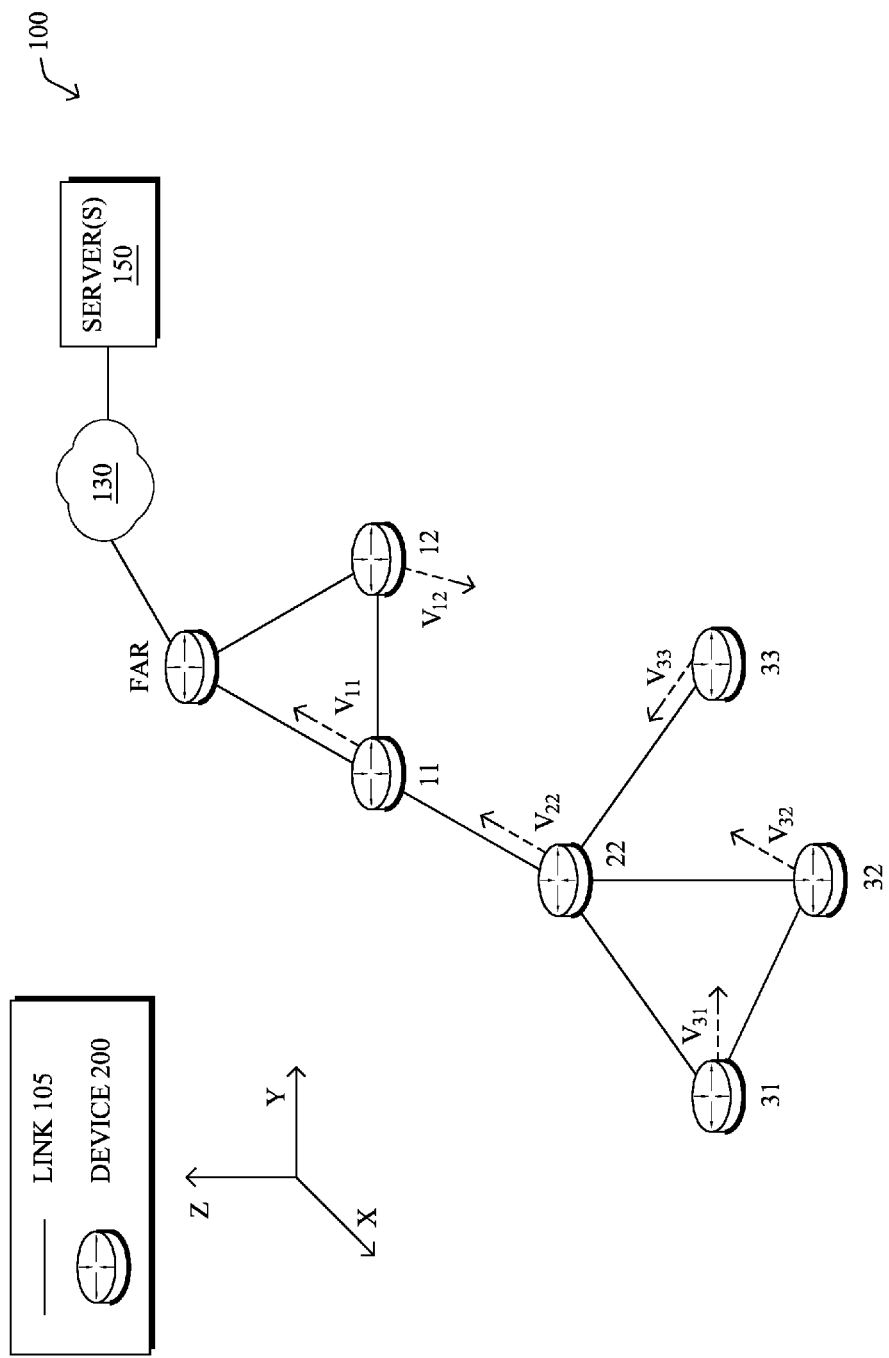
FIG. 1 illustrates an example communication network.

According to one or more embodiments of the disclosure, a device in a network receives packet arrival information for a packet from a neighbor of the device in the network. The packet arrival information indicates a likelihood of the packet being received by a target node that is moving in the network were the packet forwarded by the neighbor to the target node. The device determines local packet arrival information for the packet that indicates a likelihood of the packet being received by the target node were the packet forwarded by the device to the target node. The device compares the packet arrival information received from the neighbor to the local packet arrival information, to determine whether the device has a higher likelihood of the packet being received by the target node were the packet forwarded by the device to the target node than forwarded by the neighbor to the target node. The device forwards the packet to the target node based on a determination that the device has a higher likelihood of the packet being received by target node were the packet forwarded by the device to the target node than were the packet forwarded by the neighbor to the target node.

In further embodiments, a supervisory device in a network receives data indicative of future locations of first and second nodes in the network, wherein the first and second nodes are mobile in the network. The supervisory device determines a likelihood of the second node receiving a packet sent by the first node based on the received data indicative of the future locations of the first and second nodes. The supervisory device generates a communication schedule based on the determined likelihood of the second node receiving a packet sent by the first node. The supervisory device causes the first node to send the packet to the second node according to the communication schedule.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

In some cases, network 100 may also include a root node, such as a field area router (FAR), that interconnects the local network(s) with a WAN 130, which may enable communication with other relevant devices such as management devices or servers 150, e.g., a network management server (NMS), a dynamic host configuration protocol (DHCP) server, a constrained application protocol (CoAP) server, an outage management system (OMS), a path computation engine (PCE) server, etc. For example, the FAR may provide a gateway between the local nodes 11-33 and the public Internet.

As shown, any or all of devices 200 in network 100 may be mobile at any given time (e.g., node 11 may move at a velocity $v_{11}$, node 12 may move at a velocity $v_{12}$, etc.) in two or three dimensions. Accordingly, links 105 may be in a constant state of flux due to the changing locations of devices 200, changing external conditions (e.g., interference due to weather, obstructions, etc.), and the like. For example, assume that node 12 is moving in a direction away from node 11. In such a case, the link 105 between nodes 11 and 12 may become unusable at a certain range or when either of nodes 11-12 become obstructed. In another example, new data links 105 may be formed when one or more nodes move within proximity of one another (e.g., node 32 moves within wireless range of node 33, etc.).

Figure 2:
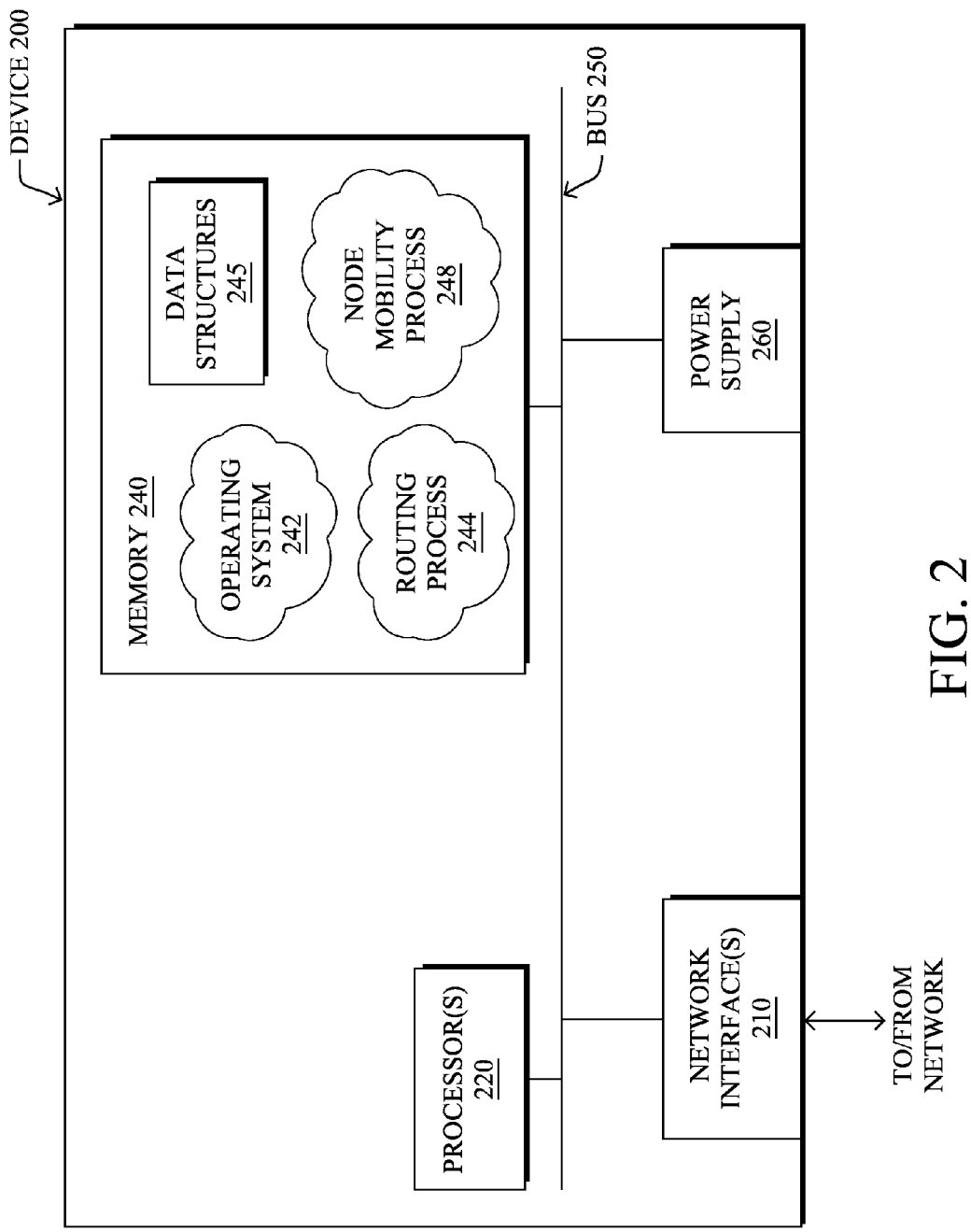
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative node mobility process 248, as described herein. Note that while node mobility process 248 is shown in centralized memory 240, alternative embodiments provide for the process to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions.

Node mobility process 248 may work in conjunction with routing process 244 for purposes of supporting routing decisions when one or more nodes in the network are mobile. For example, node mobility process 248 may facilitate routing changes that may occur as a result of the physical location of device 200 changing over the course of time and/or the location of another device in communication with device 200 changing. In some embodiments, node mobility process 248 may be configured to provide supervisory control over the routing decisions of one or more other nodes in the network. For example, node mobility process 248 may determine when and how two nodes in the network are to communicate with one another.

As noted above, links between nodes in a mesh network, as well as the topology of the network itself, may be in a state of flux due in part to the mobility of the nodes themselves. Thus, routing decisions in a mesh network may be markedly different than in traditional computing networks. In some cases, routing decisions in a mesh network may be based on observed network metrics. For example, a node may base routing decisions on one or more received signal strength indicators (RSSIs) (e.g., by selecting the strongest link), path metrics (e.g., in terms of dropped packets, jitter, delays, etc.), or the like. However, these approaches generally do not take into account the likelihood of a target node actually receiving a sent packet.

Routing Traffic Over Chaotic Networks

The techniques herein allow a physically mobile device to expose information regarding network traffic carried by the device. In some aspects, the exposed information may include data indicative of when and how the device is going to approach a destination/target of the traffic, physically. In further aspects, the destination/target node may also expose its interception strategy to other nodes in the network. If another node (e.g., a neighbor node) has a better interception strategy, the neighbor may claim the content. For example, the neighbor may take over delivery of the traffic, if the neighbor is able to transport the traffic farther towards the ultimate destination of the traffic than the current node transporting the traffic.

Specifically, according to one or more embodiments of the disclosure as described in detail below, a device in a network receives packet arrival information for a packet from a neighbor of the device in the network. The packet arrival information indicates a likelihood of the packet being received by a target node that is moving in the network were the packet forwarded by the neighbor to the target node. The device determines local packet arrival information for the packet that indicates a likelihood of the packet being received by the target node were the packet forwarded by the device to the target node. The device compares the packet arrival information received from the neighbor to the local packet arrival information, to determine whether the device has a higher likelihood of the packet being received by the target node were the packet forwarded by the device to the target node than forwarded by the neighbor to the target node. The device forwards the packet to the target node based on a determination that the device has a higher likelihood of the packet being received by target node were the packet forwarded by the device to the target node than were the packet forwarded by the neighbor to the target node.

Illustratively, the techniques described herein may be performed by hardware, software, and/or firmware, such as in accordance with the node mobility process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various wireless communication protocols, and as such, may be processed by similar components understood in the art that execute those protocols, accordingly.

Figure 3:
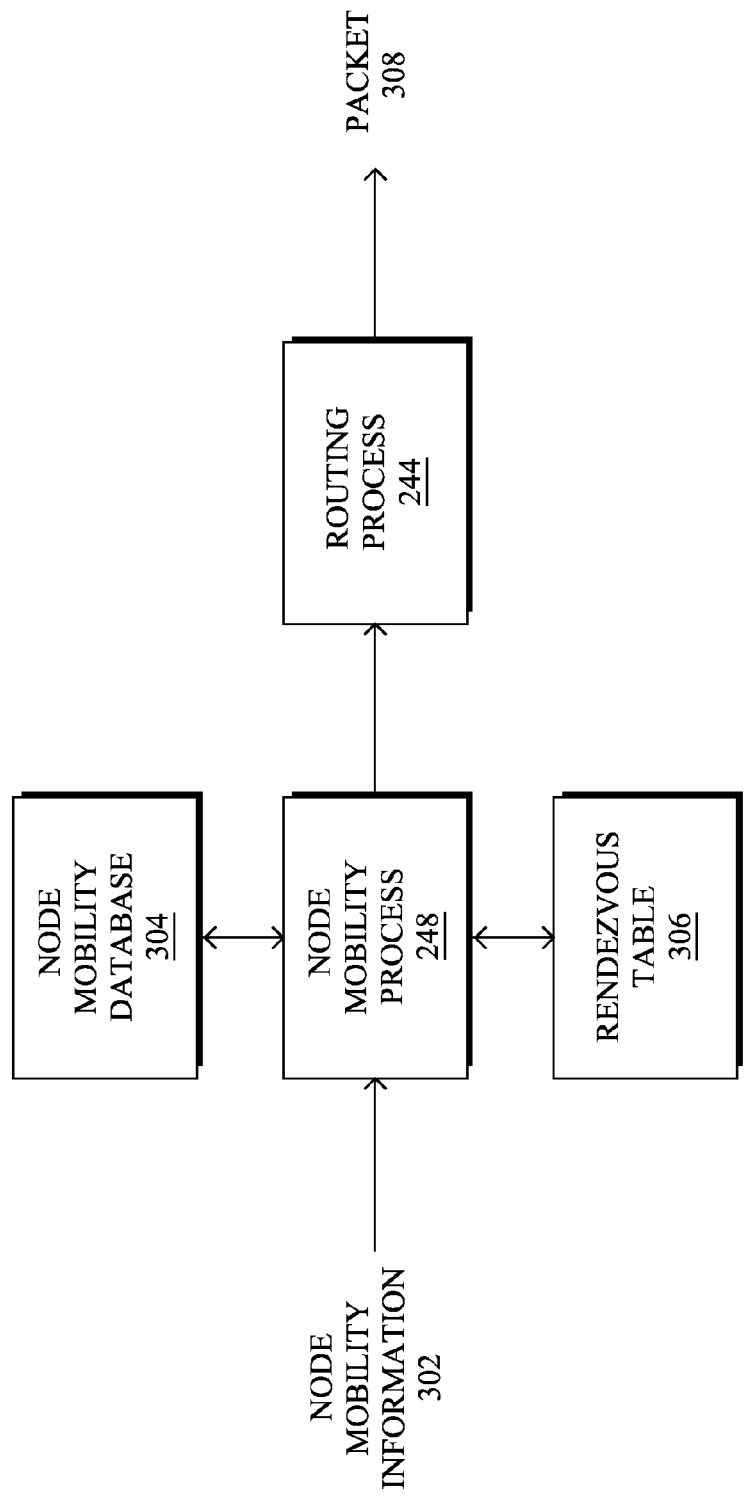
FIG. 3 illustrates an example architecture for routing traffic in a communication network.

Operationally, FIG. 3 illustrates an example architecture 300 to implement the routing techniques described herein, according to various embodiments. As shown, architecture 300 may use delay or disruption tolerant networking (DTN) and "gossip" approaches to forward traffic in a highly dynamic network in which some or all of the network nodes are mobile. Architecture 300 may be implemented by one or more devices in the network (e.g., in a distributed manner across devices).

According to various embodiments, node mobility process 248 may be configured to cause the executing device (e.g., node/device 200) to record node mobility information regarding the physical location and movement of the local device in a node mobility database 304 (e.g., stored in data structures 245). For example, node mobility process 248 may store data indicative of a location, time, speed, direction, etc. of the local device in node mobility database 304. Such information may be gathered by node mobility process 248 from one or more local sensors (e.g., an accelerometer, a speed sensor, etc.), a local positioning system (e.g., a satellite-based positioning system, a triangulation system, etc.), an on-board clock, or any other data source. In some embodiments, node mobility process 248 may be further configured to perform any number of calculations on the received, raw data and store the results in node mobility database 304. For example, node mobility process 248 may process the raw data and predict one or more future locations of the device based on the raw data (e.g., by extrapolating from the current location, direction of travel, etc. of the device). In further cases, node mobility process 248 may store data indicative of the future location of the local device in node mobility database 304 based on a travel schedule for the device. For example, an autonomous vehicle may have a predefined flight plan or the like, which may be used by node mobility process 248 to predict where the device will be at any given time in the future.

During operation, nodes/devices in the network may exchange their locally maintained node mobility data with other nodes, such as when two nodes pass within range of one another. For example, as shown, the local device executing node mobility process 248 may receive node mobility information 302 from another device regarding the location (s), direction(s) of travel, etc. of the other device and store this information in node mobility database 304. At this time, the local device may also provide its existing entries in node mobility database 304 to the other device. In other words, the two devices may exchange their node mobility database entries when the devices physically meet as a result of their movements (e.g., are within communication proximity of one another).

In some embodiments, node mobility information 302 may further include mobility information regarding devices encountered by the sender of node mobility information 302. For example, assume that node A sends node mobility information 302 to the local device executing processes 248 and 244. In such a case, node mobility information 302 may include mobility information regarding not only the sending node A, but also that of any other nodes encountered by node A in the network (e.g., node B, node C, etc.). By doing so, the local node implementing architecture 300 may store mobility information regarding nodes A, B, C, the local node, etc. in node mobility database 304, even if the local node did not actually encounter the respective node.

As shown, node mobility process 248 may determine rendezvous information based on the mobility information stored in node mobility database 304 and store the rendezvous information in a rendezvous table 306. Generally, rendezvous information may be a prediction regarding when two or more nodes are expected to meet at some point in the future. In a base case, rendezvous table 306 may include rendezvous information regarding when the local device implementing architecture 300 is expected to encounter another particular node in the network. However, such as when node mobility information 302 includes information regarding a plurality of nodes, node mobility process 248 may also predict when other nodes in the network are likely to encounter one another. For example, node mobility process 248 may take into account the current and/or prior locations of the nodes, the directions of travel of the nodes, the speeds and accelerations of the nodes, or the like, to predict when two nodes will rendezvous in the network.

In various embodiments, routing process 244 may use the information stored in rendezvous table 306 to make routing decisions based on a likelihood of interception. Notably, in networks having highly mobile nodes, the most direct routing path both physically and/or temporally may not be available due to the movement of the nodes. For example, nodes A, B, and C may not be within communication range of one another, may be moving in opposite directions, etc. Using the predicted rendezvous points in rendezvous table 306, routing process 244 may determine a likelihood of a packet 308 reaching its ultimate destination when routing the packet via the moving nodes.

Figure 4A:
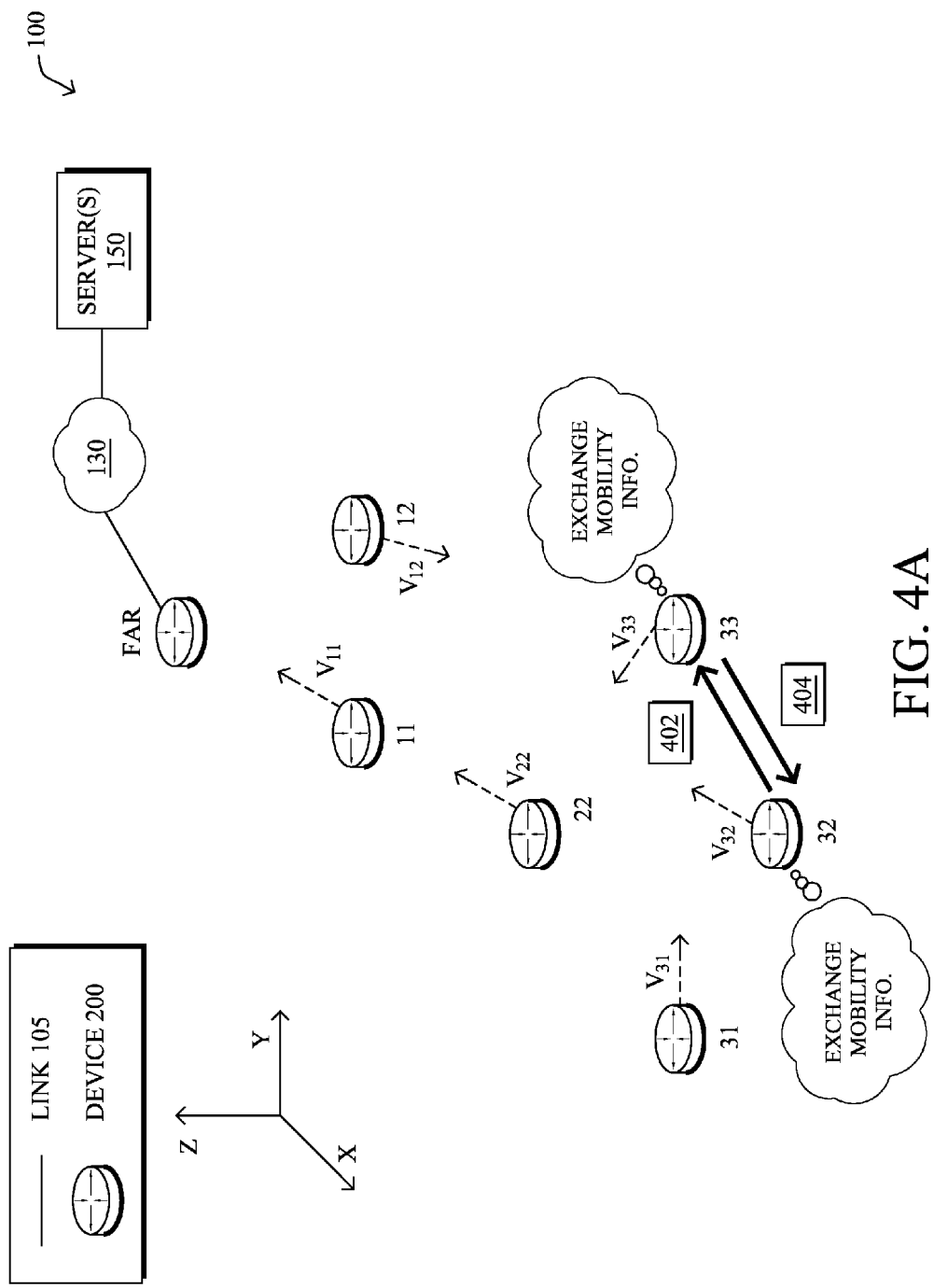
FIGS. 4A-4B illustrate examples of network nodes exchanging mobility information.
Figure 4B:
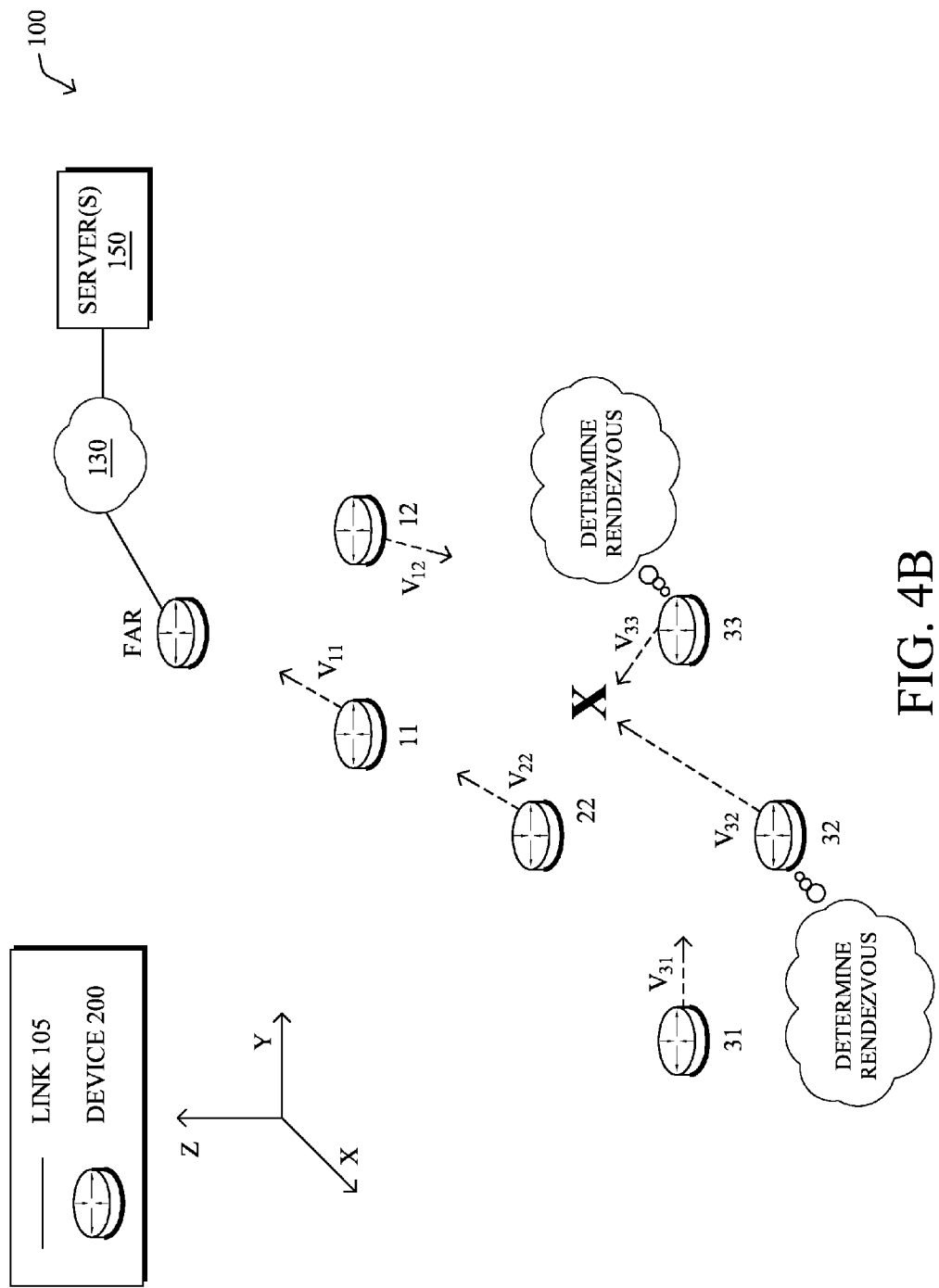

Referring now to FIGS. 4A-4B, examples are shown of network nodes exchanging mobility information in computer network 100. As noted previously, any or all of the nodes in network 100 may be moving in two or three dimensions, meaning that any given node may move within range of another node and/or out of range of another node. Such a range may be based on predefined radii associated with the nodes (e.g., if the nodes are within n-number of feet of one another) or the like, so long as the nodes exchanging mobility and/or rendezvous information are within communication range of one another.

As shown in FIG. 4A, assume that nodes 32 and 33 move within range of one another. In such a case, node 32 may send the contents of its node mobility database to node 33 via a message 402. Such information may include information regarding the mobility of node 32 and other nodes encountered by node 32, previously. For example, if node 32 previously exchanged mobility information with node 31, node 32 may include the mobility information regarding node 31 in message 402 sent to node 33. Likewise, node 33 may provide information from its own node mobility database to node 32 via message 404. This information may include data regarding the mobility of node 33 and/or any other nodes encountered by node 33 (e.g., node 12, etc.). In some embodiments, exchanged messages 402-404 may also include rendezvous information (e.g., from the local rendezvous tables of the nodes). For example, message 402 may include a predicted rendezvous between node 32 and node 31.

In FIG. 4B, nodes 32 and 33 may use the exchanged mobility information to predict when the nodes in computer network 100 will rendezvous with one another. For example, node 32 and/or node 33 may use the exchanged mobility information to predict that nodes 32 and 33 will rendezvous near a point in space (denoted 'X' in FIG. 4B) at a certain time in the future. In doing so, nodes 32 and 33 may each calculate a likelihood of interception value for the other respective node and use this calculation for purposes of making routing decisions.

In some embodiments, a likelihood of interception value may be based on the confidence a device has in its received node mobility information. In particular, exchanged mobility information may become stale as time passes and/or with greater distances, thereby decreasing the accuracy of a predicted rendezvous between two nodes. Accordingly, nodes 32 and 33 may perform any number of operations in response to receiving mobility information regarding a particular node, depending on whether or not the receiver already has mobility information regarding a particular node stored in its node mobility database, the source of the received and/or pre-existing information, the age of the pre-existing information, etc.

Figure 5:
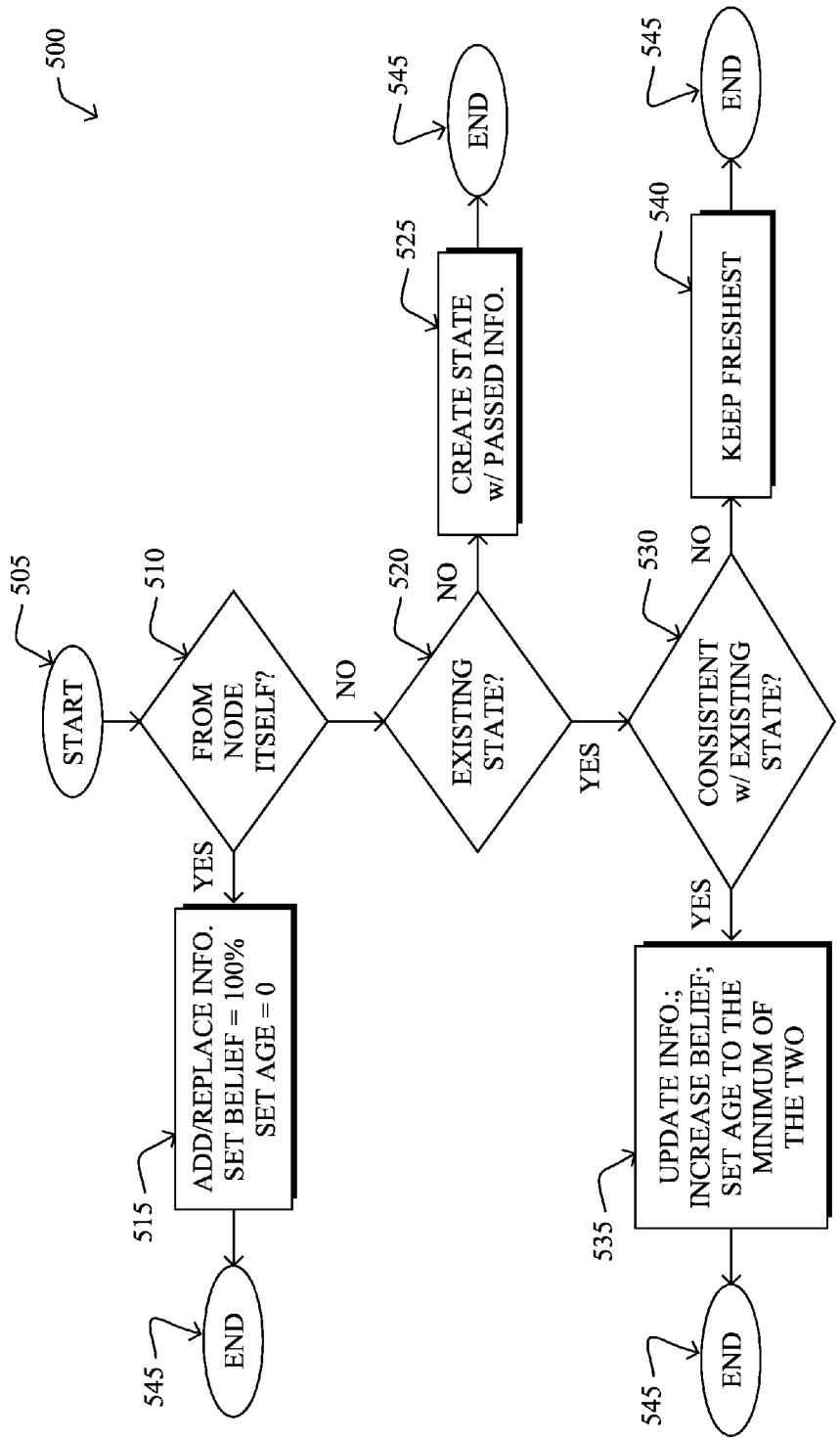
FIG. 5 illustrates an example simplified procedure for updating node mobility information.

Referring now to FIG. 5, an example simplified procedure 500 is shown for updating node mobility information, according to various embodiments. Generally, procedure 500 may be employed by a device (e.g., device 200 executing node mobility process 248), in response to receiving node mobility information from another device in the network. The procedure 500 may begin at step 505 and continue on to step 510 where the device determines whether the device received node mobility information directly (e.g., the mobility information is associated with the node from which the mobility information was received) or indirectly (e.g., the mobility information is for a node other than the sending node). If the device determines that the node mobility information was received directly from the node associated with the mobility information, procedure 500 may continue on to step 515. However, if the information was received indirectly (e.g., via one or more intermediary nodes), procedure 500 may continue on to step 520.

At step 515, the device may treat the directly-received mobility information as having maximal accuracy with respect to the node. For example, the device may perform any or all of the following: 1.) updating the local node mobility database to reflect the received mobility information, 2.) setting a belief score to a maximal value (e.g., belief=100%), and/or 3.) setting an age score to be a minimal value (e.g., age=0). In some embodiments, the device may use fuzzy logic techniques to determine and associate the belief scores with any node mobility information for a particular node. Generally, fuzzy logic allows for the belief score to be represented as a range of values, as opposed to existing only in a binary manner (e.g., believable or not believable).

As noted previously, the device may use the node mobility database entries for the node to predict a future rendezvous with the node. In some embodiments, the device may use a belief score to determine the probability/likelihood of the node being able to intercept a packet sent by the device. For example, if the device is to send a packet directly to the node, it may calculate a high likelihood of interception, since the predicted rendezvous between the device and the node was based on mobility information received directly from the node. In further embodiments, the device may adjust the belief score associated with the mobility information for the node based on the age of the information (e.g., by decreasing the belief score over time). Procedure 500 then ends at step 545.

At step 520, the device may determine whether it already has state information regarding the node. For example, the receiving device may compare the received node mobility information to entries in its local node mobility database, to determine whether an entry for the node already exists in the database. If so, procedure 500 may continue on to step 530. If not, however, procedure 500 may continue on to step 525.

At step 525, if the device does not already have any pre-existing mobility information regarding the node, the device may create state for the node using the received mobility information. For example, the device may store the received mobility information in its local node mobility database, determine one or more rendezvous times and/or locations with the node. In some cases, the device may set a belief score for the received mobility information based, e.g., on an age value included in the received information, based on the number of intermediary nodes between the node and the device, or the like. Procedure 500 then ends at step 545.

At step 530, the device may determine whether or not the received node mobility information is consistent with any pre-existing mobility information/state stored by the device regarding the node. For example, assume that the device previously received node mobility information regarding a node C from node A and has recently received further mobility information regarding node C from node B. In such a case, the device may determine whether the node mobility information received from nodes A and B are consistent (e.g., in terms of the locations, directions of travel, etc. of node C). If the received mobility information is consistent with the existing state, procedure 500 continues on to step 535. However, if the newly received mobility information is not consistent with the existing state, procedure 500 continues on to step 540.

At step 535, if the newly received mobility information is consistent with the existing information maintained by the device, the device may perform a number of updates to the existing information. For example, the device may update its local information regarding the subject node based on the newly received information. If an age was previously assigned to the existing mobility information, the device may also adjust this value, in response to receiving the new mobility information regarding the subject node. For example, the device may set the stored age to be the minimum of the two ages, an average of the ages, or the like. In some embodiments, the device may also increase its existing belief score associated with the mobility information for the subject node, based on the newly received information being consistent with the existing information in the node mobility database of the device. In other words, if the device receives the same or similar mobility information regarding the subject node at different times and/or from different sources, the device may treat the newly received information as a validation that the existing information regarding the subject node is accurate. Procedure 500 then ends at step 545.

At step 540, the device may replace the existing node mobility information in its local node mobility database with the newly received information for the node, if the device determines that the two are inconsistent. In other words, the device may keep only the freshest (e.g., most recently received) mobility information for the node, if the newly received information is not consistent with the existing information the device has about the corresponding node. The device may also store a belief score and/or age with the newly received mobility information in its local node mobility database. Such information may be included in, or derived from, the newly received information. For example, the received information may indicate an age for the information (e.g., as set during the initial information exchange between the corresponding node and another node). Similarly, the device may determine the belief score for the newly received node mobility information based on the age of the information, the distance(s) between the device and the subject node, the number of intermediary nodes via which the information traversed to reach the node, etc. Procedure 500 then ends at step 545.

As would be appreciated, procedure 500 allows for devices/nodes to take into account mobility information regarding other nodes in the network, while still accounting for potential inaccuracies in the information due to the dynamic nature of the network. In some aspects, procedure 500 allows the device to treat mobility information regarding nodes recently encountered by the device as being the most precise. As time passes and/or the distance increases between the device and other nodes, the device may also depreciate the mobility information and may even filter out or remove the mobility information when the information becomes obsolete (e.g., based on the age of the information, the distance between the device and the subject node, etc.). In addition, procedure 500 allows the device to quantify the potential error and quality of the node mobility information. When the information is not obtained directly from the subject node, the device may determine whether this information is consistent with what the device already knows about the node. In turn, if the information is consistent, the device may increase its belief in the accuracy of the information.

Figure 6:
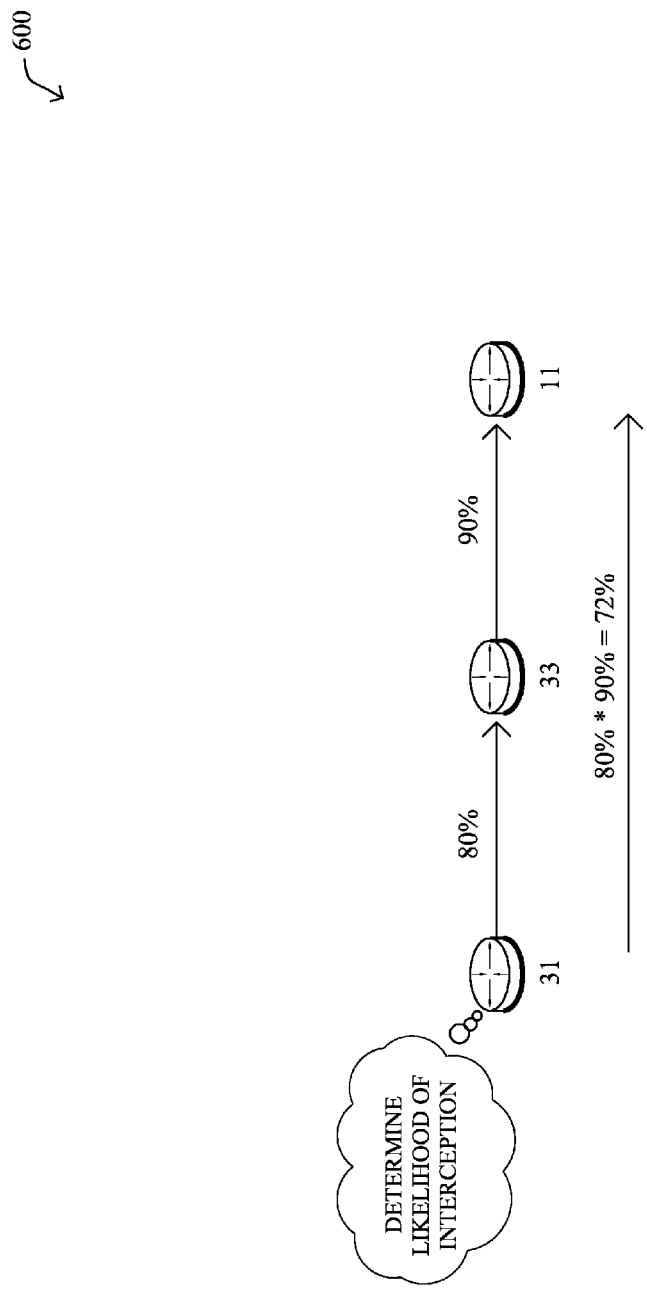
FIG. 6 illustrates an example of a node determining the likelihood of packet interception by a moving target node.

FIG. 6 illustrates an example of a node determining the likelihood of packet interception by a moving target node, according to various embodiments. As noted previously, a device in the network may make routing decisions based on a quantified likelihood of a packet reaching its intended target. For example, assume that device/node 31 wishes to send a packet to node 11, either as the ultimate destination of the packet or as an intermediate router. In such a case, the device may evaluate the likelihood of the packet being intercepted or otherwise reaching node 11, should the device send the packet via node 33.

In various embodiments, a device may determine the likelihood of a sent packet reaching any other node in the network based on a belief score associated with a predicted rendezvous of the device with the subject node. For example, as shown, node 31 may evaluate node mobility information received from node 33 and its own mobility information, to determine when nodes 31 and 33 will rendezvous next. In some cases, node 31 may use the belief score associated with the mobility information regarding node 33 to quantify the likelihood of node 33 receiving a packet from node 31 at the predicted rendezvous. As noted above, factors that may affect this belief score may include the age of the mobility information, how node 31 received the information (e.g., directly from node 33, via one or more third party nodes, etc.), and the like. In some cases, the device may determine the likelihood of packet interception by also taking into account other information regarding the predicted rendezvous event, such as the predicted distance between nodes 31 and 33 at the rendezvous point, mobility information regarding node 31 (e.g., the direction of travel, itinerary, speed, etc. of node 31) which may also have a fuzzy-logic belief score associated therewith (e.g., depending on how deterministic the movement of the device is), or any other information that may influence the likelihood of a packet sent by node 31 reaching node 33.

As shown, a device may evaluate the likelihood of packet reception along multiple hops by combining the likelihood scores between the involved nodes. For example, assume that node 31 determines that there is an 80% likelihood of node 33 intercepting a packet sent by node 31 and that there is a 90% likelihood of node 11 intercepting a packet sent by node 33. In such a case, node 31 may determine the likelihood of node 11 receiving a packet sent by node 31 via node 33 by multiplying the likelihood scores for each of the hops (e.g., the likelihood of the packet reaching node 11 is 80%*90%=72%).

Figure 7A:
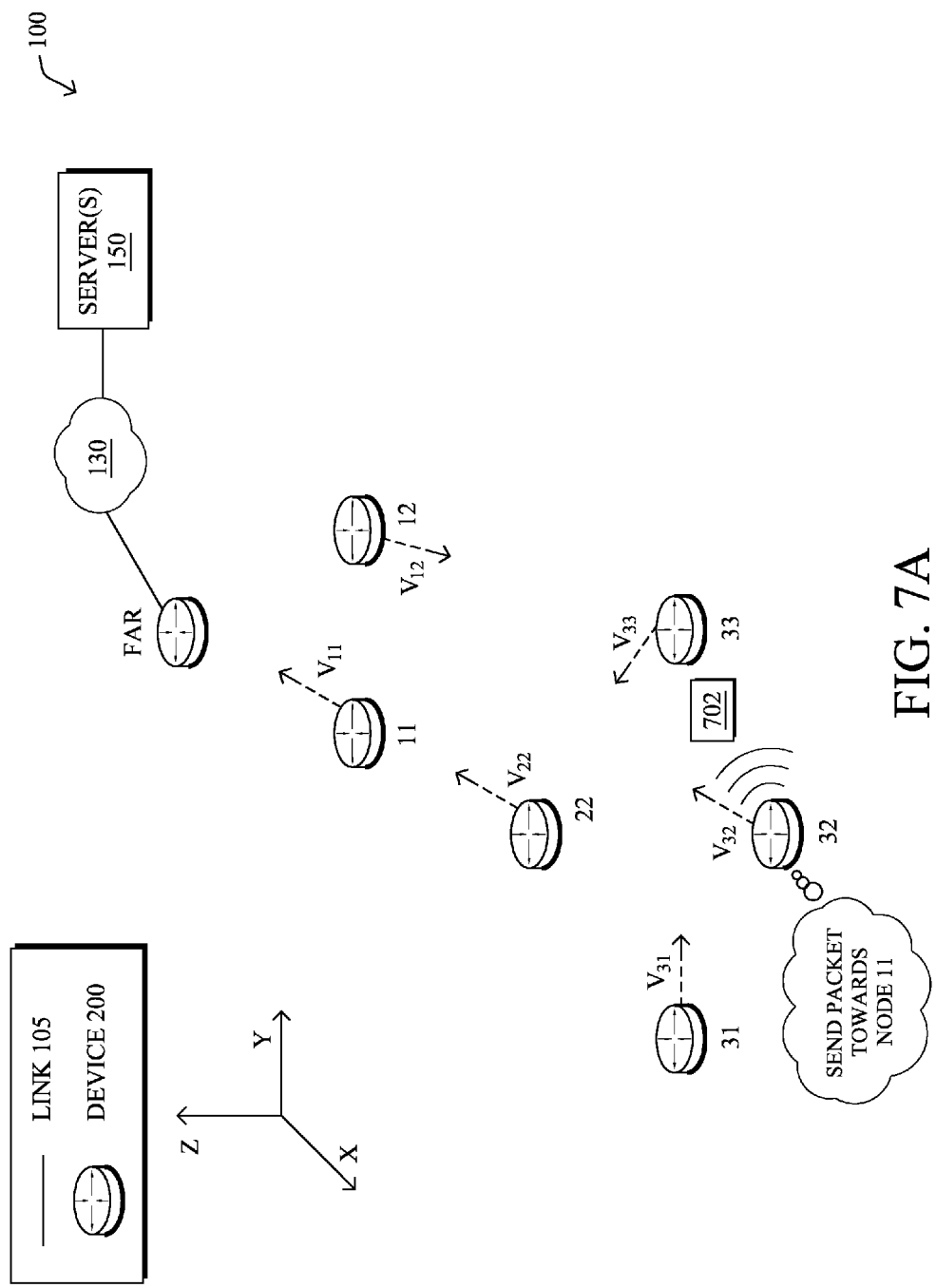
FIGS. 7A-7G illustrate examples of nodes communicating in a network.

Referring now to FIGS. 7A-7G, examples are shown of nodes communicating in computer network 100, according to various embodiments. As shown in FIG. 7A, assume that node 32 is to send a packet 702 to node 11 and that nodes 11-33 exchange node mobility information using the techniques described herein. As a result, node 32 may be able to predict, at least to a certain degree, when and where any of nodes 11-33 will rendezvous with one another, allowing the packet to be forwarded between the meeting nodes. Depending on the resource constraints of nodes 11-33 (e.g., in terms of memory, processing resources, etc.), any given node in network 100 may recursively evaluate the likelihood of any other node receiving packet 702, when passed along any number of hops.

In some embodiments, nodes 11-33 may be configured to make a limited number of copies of packet 702 in network 100, to augment the change of packet 702 being delivered to its ultimate destination, node 11. In such a case, packet 702 may include sequence information, allowing the destination to reconstitute the original order of a flow of packets.

Figure 7B:
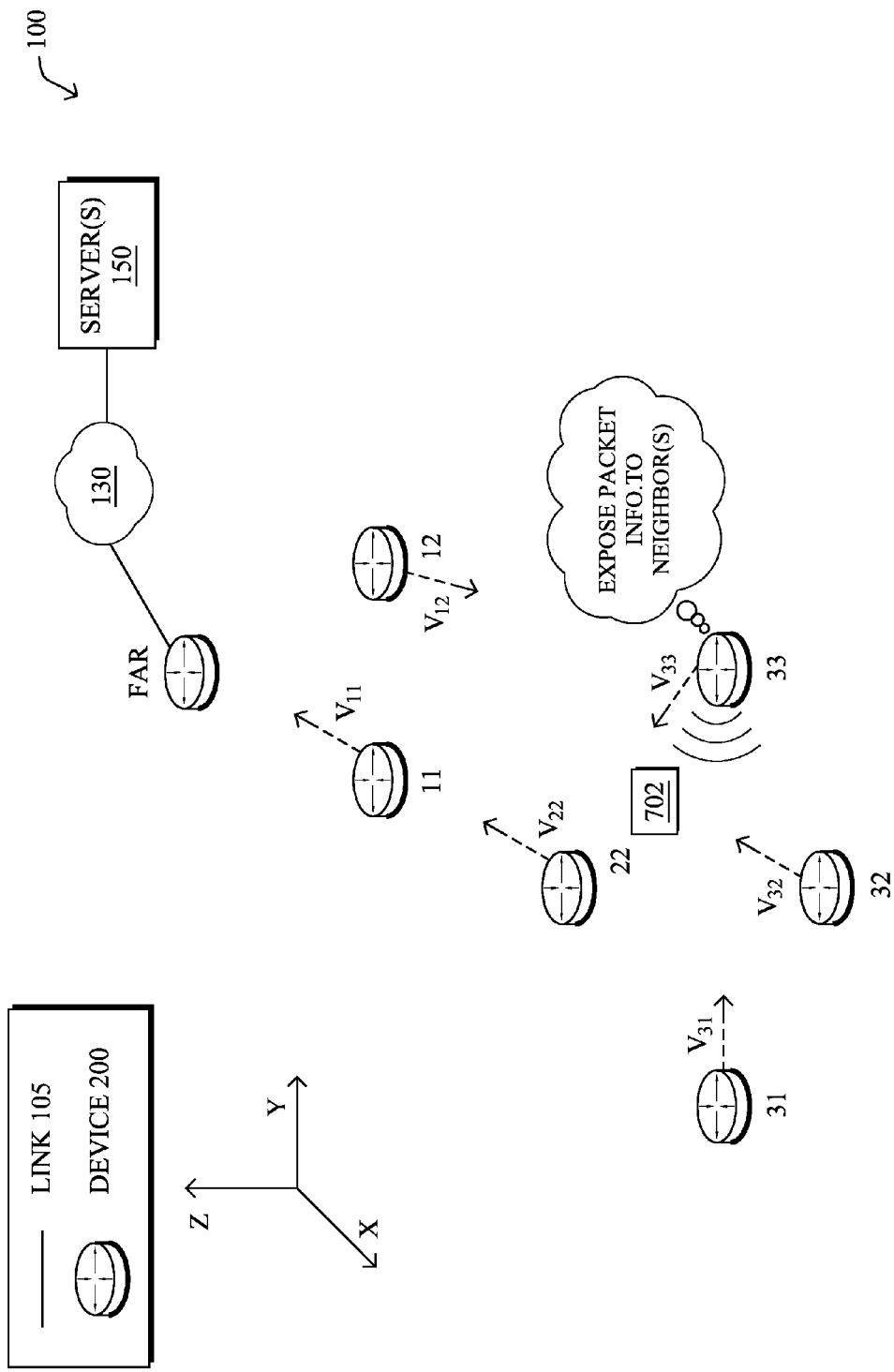

During operation, the source of the packet (e.g., node 32) and any other router carrying packet 702 (e.g., carrier node 33, etc.) towards its ultimate destination may attempt to pass packet 702 to any other peer device that it meets along the way. For example, as shown in FIG. 7B, node 33 may multicast packet 702 over one hop to any of the nodes that it encounters, to find a neighbor that has a higher degree of certainty and/or a better likelihood of interception.

Figure 7C:
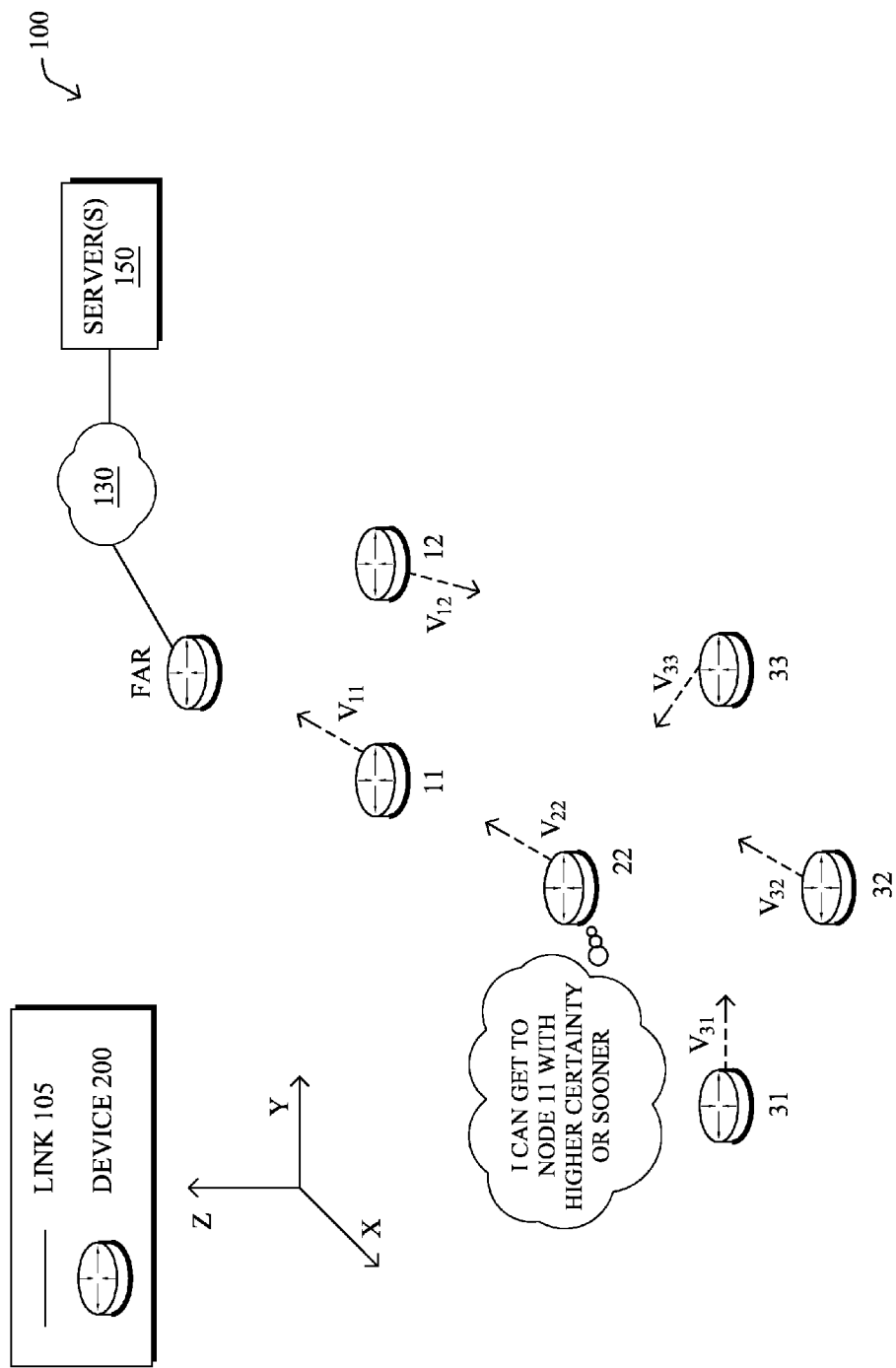

In some embodiments, the source of a packet may include metadata in the packet that facilitates forwarding the packet based on its likelihood of interception. For example, packet 702 may include any or all of the following: 1.) data indicative of a time limit that, when exceeded, causes the carrier to drop packet 702, 2.) a maximum radius from the destination, and/or 3.) rendezvous table information. In turn, a receiving node may use this metadata to determine how to process packet 702. For example, as shown in FIG. 7C, node 22 may compare the rendezvous information included in the metadata of packet 702 to the information in its local rendezvous table, to determine whether or not to "claim" packet 702. In particular, node 22 may determine whether it is more likely to reach the intended destination than the current packet carrier (e.g., node 33) and/or sooner (e.g., within the maximum allotted delivery timeframe indicated by the metadata).

Figure 7D:
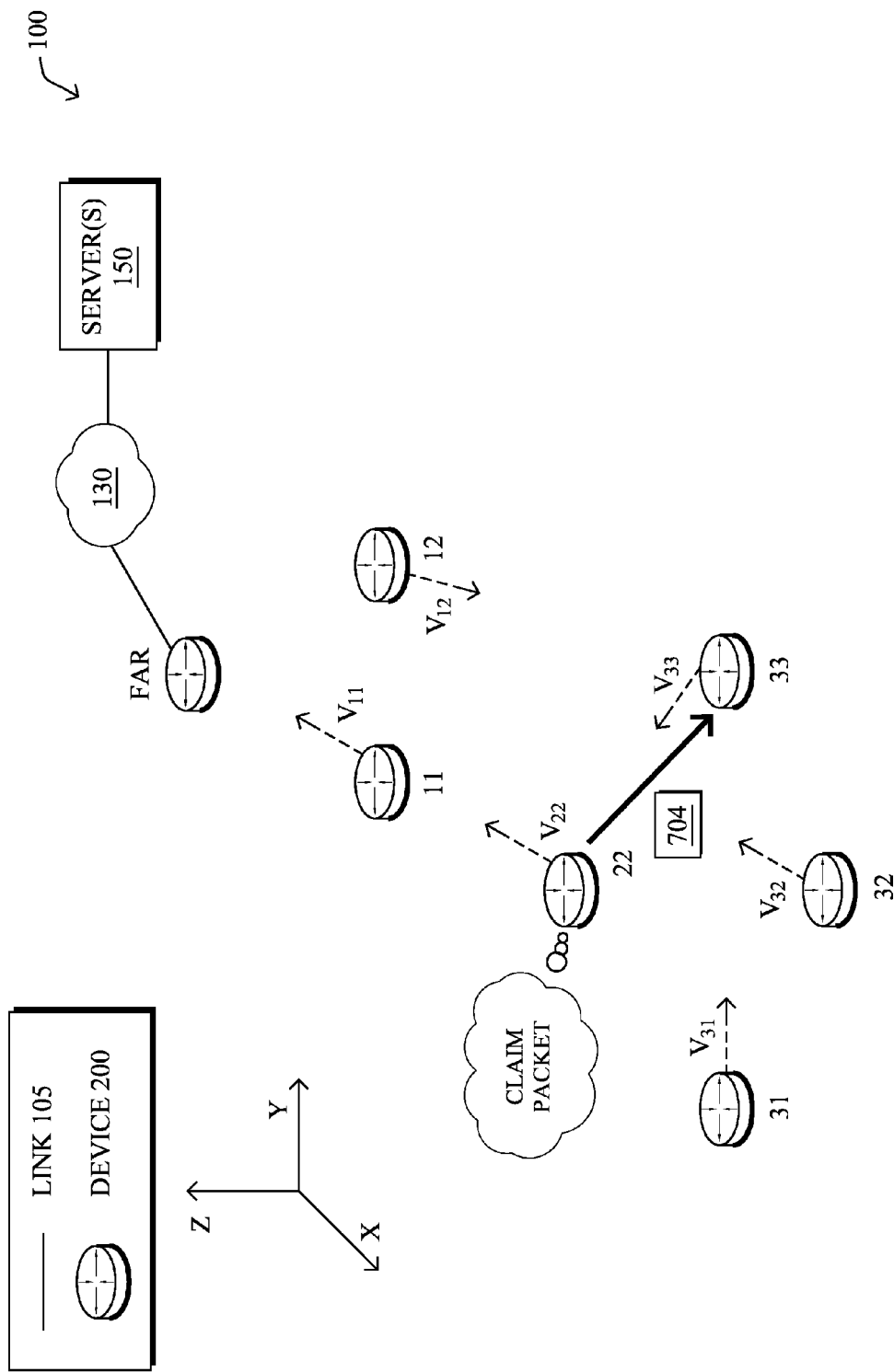
Figure 7E:
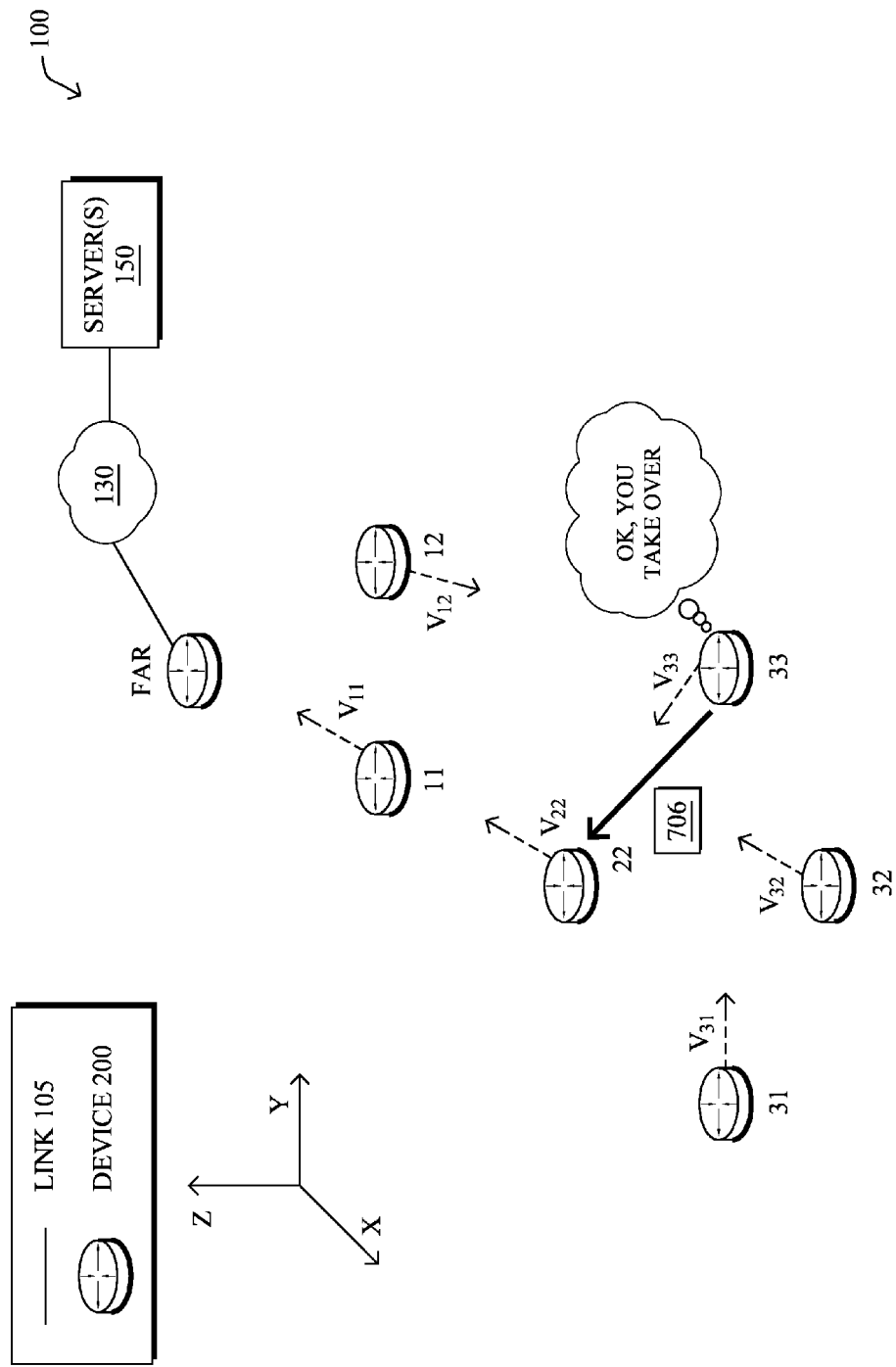

To claim a packet, a device/node may notify the current packet carrier that the node is claiming delivery of the packet. For example, as shown in FIG. 7D, node 22 may claim delivery of packet 702 by sending a notification 704 back to the current packet carrier, node 33. In some cases, notification 704 may be a unicast message that includes the rendezvous information of node 22. In one embodiment, as shown in FIG. 7E, node 33 may reply with a confirmation message 706 that confirms that node 22 is to take over handling of the delivery of packet 702.

In some cases, the current packet carrier may receive notifications from different nodes that attempt to claim the same packet (e.g., multiple nodes believe themselves better able to deliver the packet). For example, assume that node 33 multicasts packet 702 to node 22 and to another node (e.g., node 12, etc.) and, in response, receives claim notifications from both nodes. In some embodiments, node 33 may compare the returned rendezvous information in the claim notifications, to select which of the nodes has the higher likelihood of delivering the packet to the destination and/or sooner. Node 33 may also confirm the selection by notifying the selected node and/or the non-selected node.

Figure 7F:
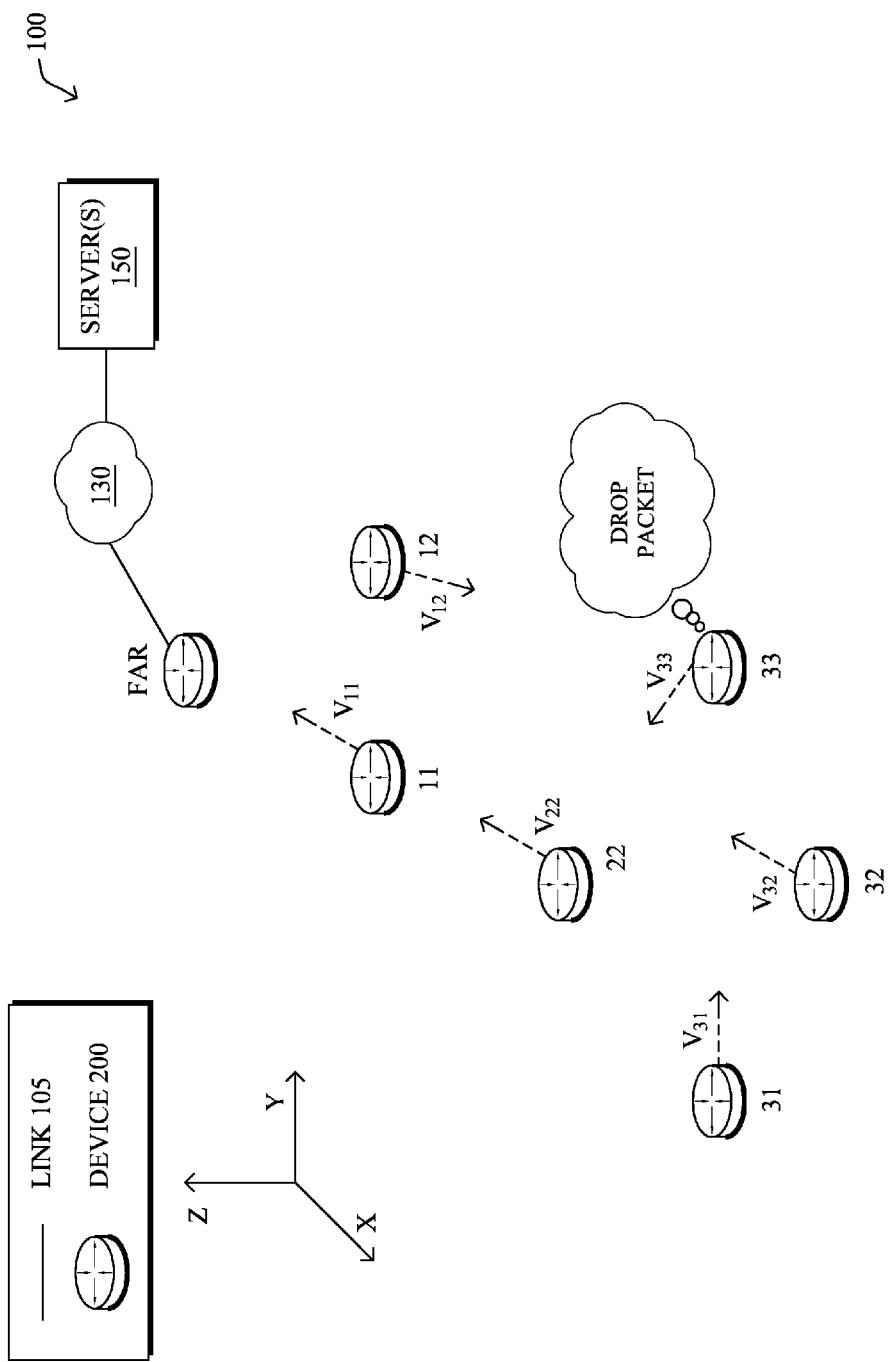

As shown in FIG. 7F, a carrier of a packet may drop the packet in a number of different circumstances. In some cases, the carrier may drop the packet if another node claims ownership of the delivery of the packet. For example, if node 22 claims packet 702, node 33 may drop its own copy of packet 702 after confirming the change. In further embodiments, node 33 may drop packet 702 if it determines that it is too far away from the target destination, that packet 702 will be delivered to the target destination after expiration of the time limit indicated by the metadata of packet 702, that packet 702 has been passed between nodes too many times, or the like.

Figure 7G:
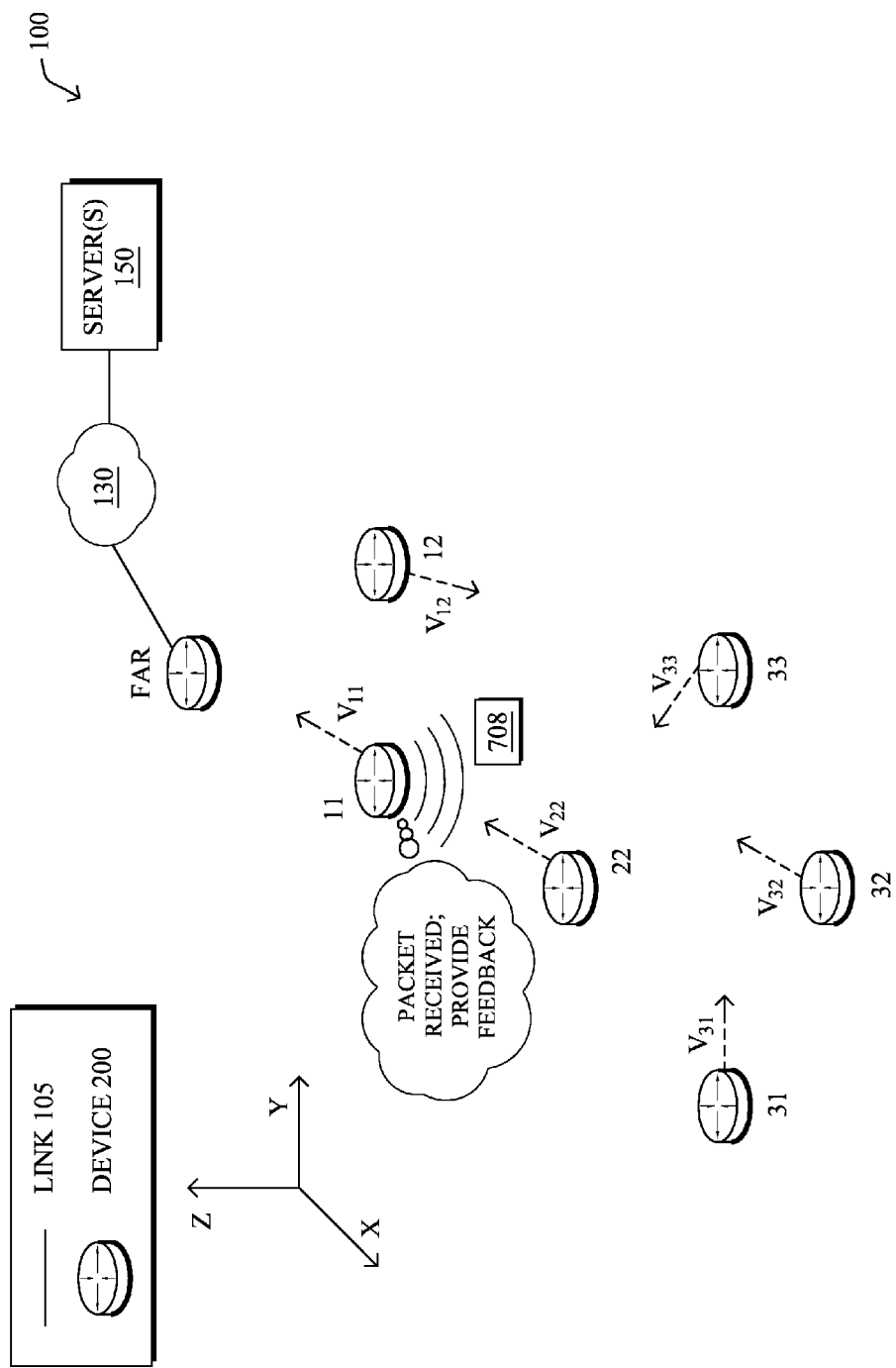

Once the packet reaches the target destination device, the receiver may send a delivery acknowledgement back towards the sender of the packet. For example, as shown in FIG. 7G, the target destination node 11 may send an acknowledgement message 708 back towards the sender. In one embodiment, information regarding the path taken by packet 702 may be recorded prior to delivery to node 11 and included in message 708, allowing nodes along the taken path to be notified that the packet was delivered. Such feedback may be used the node(s) to further enhance the computation of the likelihoods of interception by different nodes. For example, if a node uses a machine-learning based approach to determining the likelihood of delivering a packet to another given node, the node may use delivery feedback from the target destination to reinforce the learning model of the node.

In some embodiments, a variation of the above techniques may be applied to deterministic networks. Generally, determinism enforces constraints on the time at which a packet is to be delivered in a network. For example, in the industrial automation context, determinism may ensure that a control command reaches an actuator at a precise time or within a very fine range of time. In one embodiment, a supervisory device (e.g., one of servers 150 shown in network 100, the FAR, etc.) may keep track of where each device will be located, determine when nodes will meet, and/or determine the amount of additional traffic load that can be handled by a node. For example, the supervisory device may centrally control a number of robots deployed on a factory floor and instruct a particular robot to pass some of the load off to a neighbor, with the goal of delivering the traffic to a target destination device and reducing any changes in the known, future movements of any device along the trajectory.

Figure 8A:
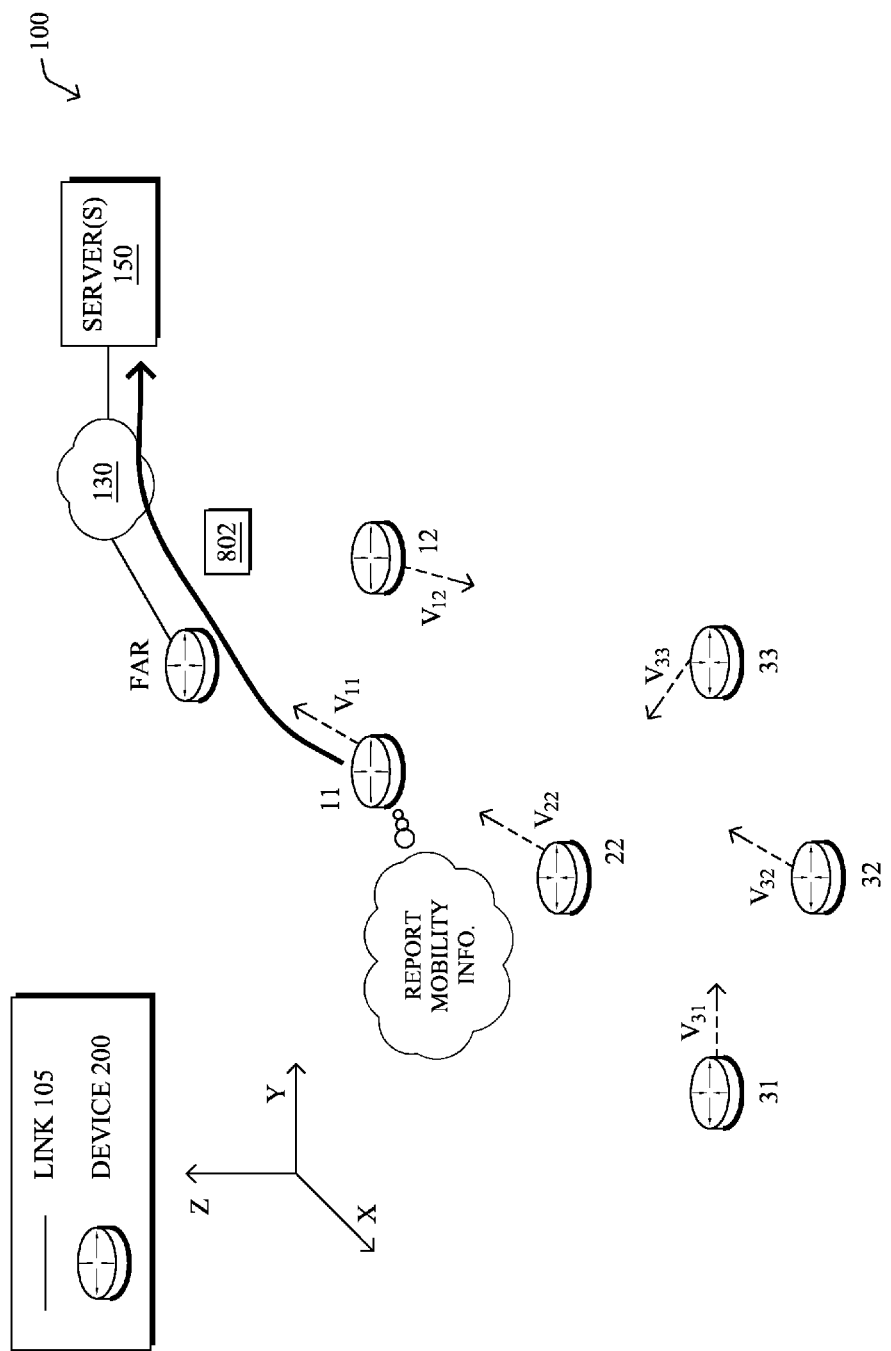
FIGS. 8A-8B illustrate an example of a device providing supervisory control over node communications.
Figure 8B:
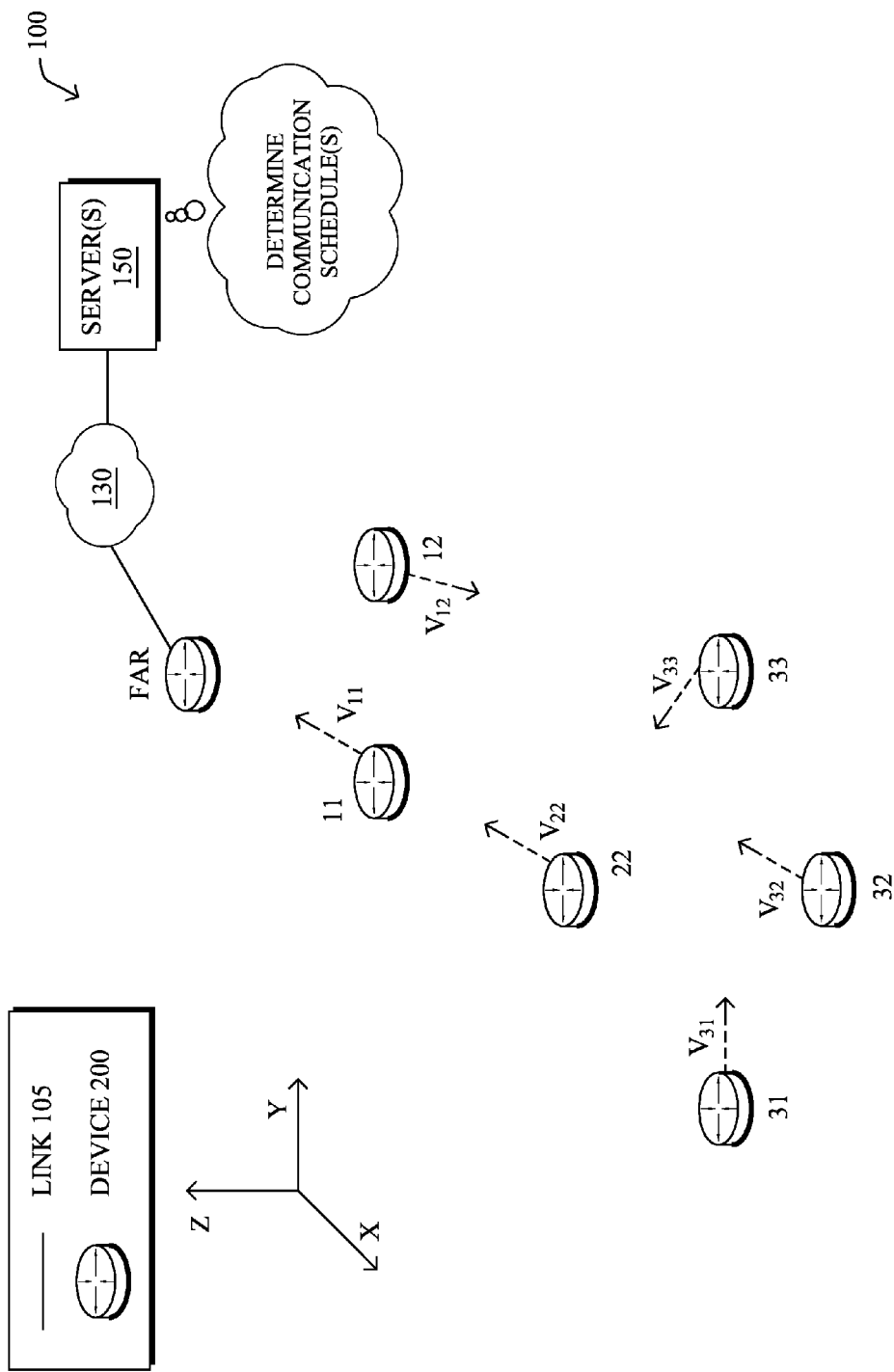

In one example, as shown in FIG. 8A, nodes 11-33 may provide their node mobility information to one of servers 150 (e.g., a supervisory device). In turn, the supervisory device may employ the techniques herein to determine the likelihood of a particular target node receiving a packet sent by any or all of nodes 11-33. In turn, as shown in FIG. 8B, the device may use the likelihood scores to generate one or more communication schedules (e.g., sets of communication instructions) that control when and how nodes 11-33 hand off packets within network 100. For example, the supervisory device may determine that node 32 should forward packets destined for the FAR to node 31, based on the packet having the greatest likelihood of reaching the FAR given what is known about the movement of nodes 11-33 in network 100. The supervisory device may then install the communication schedule(s)/instruction(s) onto the affected nodes.

Figure 9:
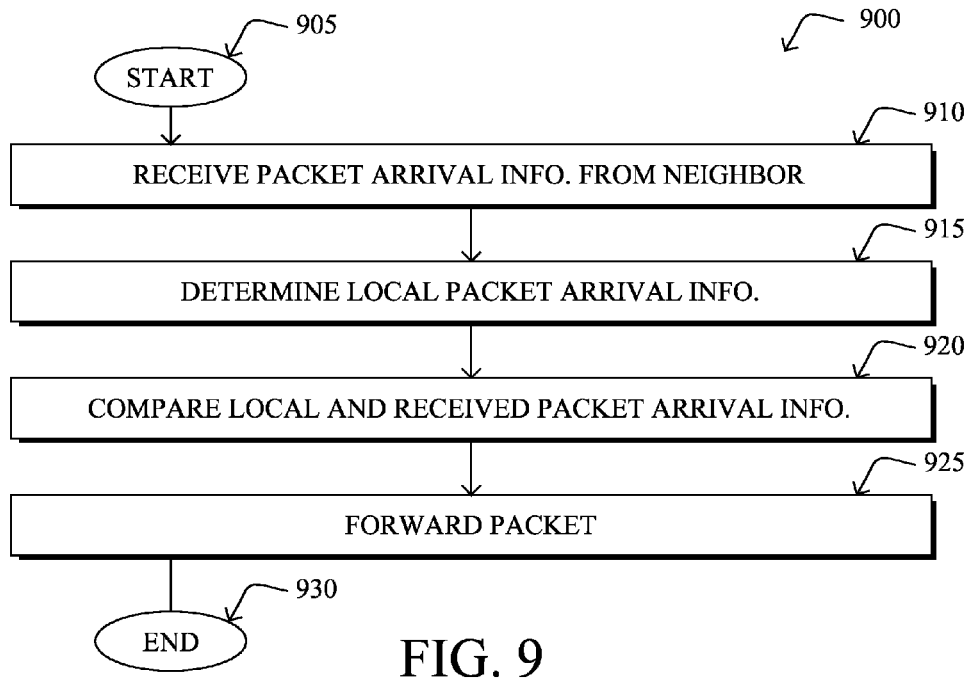
FIG. 9 illustrates an example simplified procedure for forwarding a packet towards a mobile target node.

Referring now to FIG. 9, an example simplified procedure for forwarding a packet towards a mobile target node is shown, according to various embodiments. Procedure 900 may begin at step 905 and continue on to step 910 where, as described in greater detail above, a device in a network may receive packet arrival information from a neighbor of the device in the network. In general, the packet arrival information may indicate a likelihood of the packet being received by a target node that is moving in the network were the packet forwarded by the neighbor to the target node. For example, the packet arrival information may include a likelihood score based on when the neighbor and the target node are predicted to rendezvous with one another (e.g., based on the mobility of the neighbor and the target node). Further information that may be used to quantify the likelihood of interception by the target can include the age of the mobility information used to predict the rendezvous, how the neighbor received the mobility information regarding the target node (e.g., directly vs. indirectly), or the like. In some embodiments, the packet arrival information may be included as metadata within the packet itself. For example, the device may receive the packet, which has been augmented with metadata such as rendezvous table information from the neighbor, an expiration time limit for the packet, or the like.

At step 915, as detailed above, the device may determine its own local packet arrival information. For example, the device may calculate a local likelihood score that quantifies the likelihood of a packet sent by the local device being received by the target node, were the packet forwarded by the local device. In cases in which the device and other nodes (e.g., the neighbor, the target node, etc.) are moving, the device may base its local likelihood score on mobility information regarding the local device and the other nodes. In particular, the device may analyze its own physical movements and the expected movements of other nodes in the network (e.g., based on received node mobility information), to determine the likelihood of a packet being forwarded by the device reaching the target node. In some embodiments, this analysis may further take into account a "belief" score (e.g., a fuzzy logic score) that is based on the age of the received node mobility information, the sender of the node mobility information (e.g., information received from the subject node may have a higher belief score), whether consistent mobility information was received from different sources, etc.

At step 920, the device may compare the packet arrival information received from the neighbor to the local packet information, to determine whether the device has a higher likelihood of the packet being received by the target node, as described in greater detail above. In other words, the device may determine whether it is more likely for the packet to reach the target node were the device takes over as a carrier of the packet, as opposed to that of the current carrier/neighbor. Also as noted above, this comparison may take into account factors such as the mobility of the nodes/devices in the network, the reliability/believability of the node mobility information, and the like.

At step 925, as detailed above, the device may forward the packet to the target node based on a determination that the device has a higher likelihood of the packet being received by target node were the packet forwarded by the device to the target node than were the packet forwarded by the neighbor to the target node. Said differently, the device may decide to take over the forwarding task for the packet, if the device believes itself better suited to aid in the delivery of the packet to the target over that of the neighbor of the device. In some embodiments, the device may also notify the neighbor that the device is claiming ownership of the packet (e.g., the device is taking over the forwarding). Procedure 900 then ends at step 930.

Figure 10:
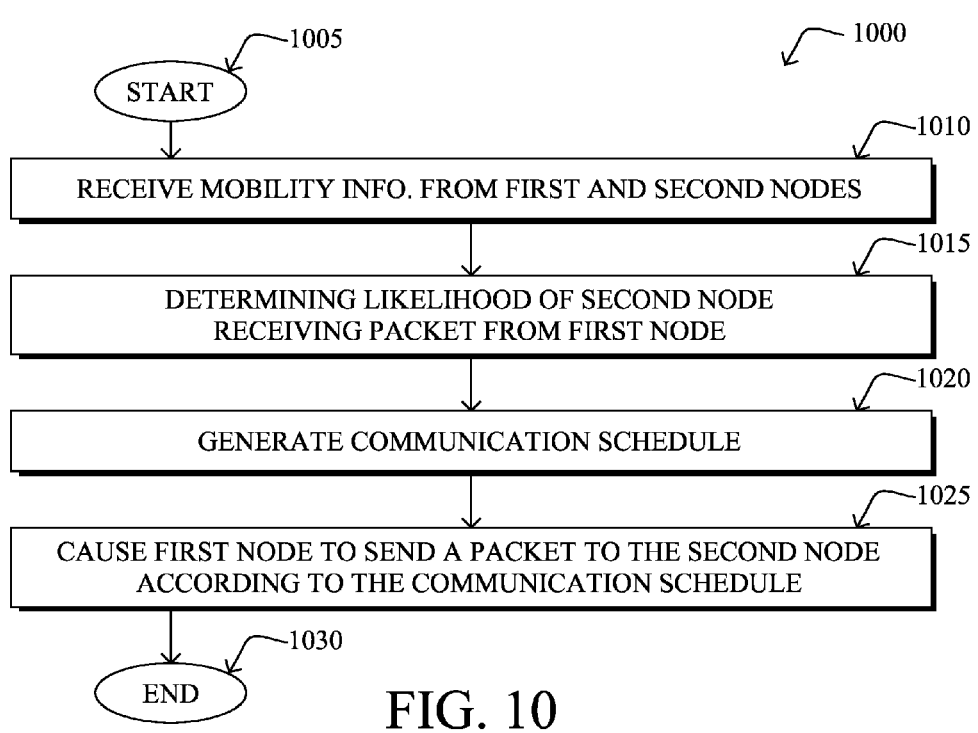
FIG. 10 illustrates an example simplified procedure for providing supervisory control over the forwarding of packets in a network.

Referring now to FIG. 10, an example simplified procedure is shown for providing supervisory control over the forwarding of packets in a network. The procedure 1000 may begin at step 1005 and continue on to step 1010 where, as described in greater detail above, a supervisory device in the network may receive node mobility information from two or more nodes in the network. As detailed above, this mobility information may include, but is not limited to, data regarding the current and/or prior physical locations of the nodes, the direction(s) of travel of the nodes, the accelerations and/or velocities of the nodes, any planned movements (e.g., according to a stored route or itinerary), or the like.

At step 1015, as detailed above, the supervisory device may determine a likelihood of a second node receiving a packet sent by a first node in the network, based on the received node mobility information. In various embodiments, the likelihood may take into account any predicted rendezvous between the two nodes, based on their mobility information. For example, the supervisory device may determine that the two nodes are likely to be within strong communication range of one another at a certain time of day. In some embodiments, the supervisory device may also take into account the believability of the mobility information, when determining the likelihood of the second node receiving a packet sent by the first node. For example, the supervisory device may take into account the age of the received mobility information, the source(s) of the mobility information, or the like, to determine the believability of the mobility information regarding the first and second nodes.

At step 1020, the supervisory device may generate a communication schedule for the devices, as detailed above. Notably, the supervisory device may determine that the first and second nodes will rendezvous at a certain time and generate a corresponding communication schedule for the two nodes. For example, if the supervisory device determines that traffic from the first node is most likely to reach a particular target node in the network when forwarded by the first node to the second node at the rendezvous time, the supervisory device may generate a corresponding communication schedule for the nodes.

At step 1025, as described in greater detail above, the supervisory device may cause the first node to the send a packet to the second node according to the communication schedule. For example, the supervisory device may instruct the first node to send traffic (if any) to the second node at a time when the nodes are predicted to rendezvous. In some cases, depending on the predictability of the movement of the nodes, such communication schedules may be used to implement determinism in the network (e.g., the packet is guaranteed to arrive at its target destination at a specific time or within a very small timeframe). Procedure 1000 then ends at step 1030.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

The techniques described herein, therefore, facilitate routing data in chaotic networking whereby nodes swarm around. In some aspects, the techniques allow an agent in a mobile device/node to expose information regarding the mobility of the device, allowing routing decisions to be made based on the quality of the mobility information and a computed likelihood of a packet sent by the device being received by a target node. This quality may take into account factors such as whether the mobility information has been seen multiple times within the same geographic zone, whether the mobility information is stale (e.g., based on the time the information was first sent), whether the information is even valid (e.g., based on the information being emitted too far away from the current position), etc. In further aspects, the techniques may be adapted for use in a deterministic network, such as when the mobility information is able to predict the rendezvous of nodes within an acceptable range of time.

While there have been shown and described illustrative embodiments that provide for the routing of packets in networking having highly mobile nodes, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of communication networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a device in a network, packet arrival information for a packet from a neighbor of the device in the network, wherein the packet arrival information indicates a time out and a likelihood of the packet being received by a target node that is moving in the network were the packet forwarded by the neighbor to the target node;
determining, by the device, local packet arrival information for the packet that indicates a likelihood of the packet being received by the target node were the packet forwarded by the device to the target node;
comparing, by the device, the packet arrival information received from the neighbor to the local packet arrival information, to determine whether the device has a higher likelihood of the packet being received by the target node were the packet forwarded by the device to the target node than forwarded by the neighbor to the target node;

forwarding, by the device, the packet to the target node based on a determination that the device has a higher likelihood of the packet being received by target node were the packet forwarded by the device to the target node than were the packet forwarded by the neighbor to the target node; and
dropping, by the device, the packet if the timeout is exceeded.

2. The method as in claim 1, wherein determining the local packet arrival information comprises:
receiving, at the device, data indicative of a future location of the target node;
predicting, by the device, a future location of the device; and
determining, by the device, the likelihood of the packet being received by target node were the packet forwarded by the device to the target node, based on the future location of the target node and the predicted future location of the device.

3. The method as in claim 2, further comprising:
associating, by the device, a confidence value with the data indicative of the future location of the target node, wherein the device forwards the packet based in part on the confidence value associated with the data.

4. The method as in claim 3, further comprising:
maximizing, by the device, the confidence value associated with the data indicative of the future location of the target node, in response to receiving the data directly from the target node.

5. The method as in claim 3, further comprising:
increasing, by the device, the confidence value associated with the data indicative of the future location of the target node, in response to receiving the data from a plurality of nodes in the network.

6. The method as in claim 3, further comprising:
decreasing, by the device, the confidence value associated with the data indicative of the future location of the target node as a function of time.

7. The method as in claim 3, further comprising:
using fuzzy logic to determine the confidence value associated with the data indicative of the future location of the target node.

8. The method as in claim 3, further comprising:
adjusting, by the device, the confidence value associated with the data indicative of the future location of the target node in response to receiving an indication that the target node received the packet.

9. The method as in claim 1, further comprising:
notifying the neighbor that the device will forward the packet, based on the determination that the device has a higher likelihood of the packet being received by the target node were the packet forwarded by the device to the target node than were the packet forwarded by the neighbor to the target node.

10. An apparatus, comprising:
one or more network interfaces to communicate with a network;
a processor coupled to the network interfaces and configured to execute one or more processes; and
a memory configured to store the one or more processes executable by the processor, the one or more processes when executed configured to:
receive packet arrival information for a packet from a neighbor of the apparatus in the network, wherein the packet arrival information indicates a timeout and a likelihood of the packet being received by a target node that is moving in the network were the packet forwarded by the neighbor to the target node;

determine local packet arrival information for the packet that indicates a likelihood of the packet being received by the target node were the packet forwarded by the apparatus to the target node;

compare the packet arrival information received from the neighbor to the local packet arrival information, to determine whether the apparatus has a higher likelihood of the packet being received by the target node were the packet forwarded by the apparatus to the target node than forwarded by the neighbor to the target node;

forward the packet to the target node based on a determination that the apparatus has a higher likelihood of the packet being received by target node were the packet forwarded by the apparatus to the target node than were the packet forwarded by the neighbor to the target node; and drop the packet if the timeout is exceeded.

11. The apparatus as in claim 10, wherein the apparatus determines the local packet arrival information by:

receiving data indicative of a future location of the target node;

predicting a future location of the apparatus; and determining the likelihood of the packet being received by target node were the packet forwarded by the apparatus to the target node, based on the future location of the target node and the predicted future location of the apparatus.

12. The apparatus as in claim 11, wherein the process when executed is further configured to:

associate a confidence value with the data indicative of the future location of the target node, wherein the apparatus is configured to forward the packet based in part on the confidence value associated with the data.

13. The apparatus as in claim 12, wherein the confidence value is determined using fuzzy logic.

14. The apparatus as in claim 10, wherein the process when executed is further configured to:

notify the neighbor that the apparatus will forward the packet, based on the determination that the apparatus has a higher likelihood of the packet being received by the target node were the packet forwarded by the apparatus to the target node than were the packet forwarded by the neighbor to the target node.

15. The apparatus as in claim 10, wherein the received packet arrival information further comprises a distance value, and wherein the apparatus is configured to drop the packet if a predicted distance between the apparatus and the target node exceeds the distance value.

16. A tangible, non-transitory computer-readable media comprising program instructions, which when executed on a processor are configured to:

receive packet arrival information for a packet from a neighbor of an apparatus in the network, wherein the packet arrival information indicates a timeout and a likelihood of the packet being received by a target node that is moving in the network were the packet forwarded by the neighbor to the target node;

determine local packet arrival information for the packet that indicates a likelihood of the packet being received by the target node were the packet forwarded by the apparatus to the target node;

compare the packet arrival information received from the neighbor to the local packet arrival information, to determine whether the apparatus has a higher likelihood of the packet being received by the target node were the packet forwarded by the apparatus to the target node than forwarded by the neighbor to the target node;

forward the packet to the target node based on a determination that the apparatus has a higher likelihood of the packet being received by target node were the packet forwarded by the apparatus to the target node than were the packet forwarded by the neighbor to the target node; and drop the packet if the timeout is exceeded.

17. The tangible, non-transitory computer-readable media comprising program instructions as in claim 16, wherein the process determines the local packet arrival information by:

receiving data indicative of a future location of the target node;

predicting a future location of the apparatus; and determining the likelihood of the packet being received by target node were the packet forwarded by the apparatus to the target node, based on the future location of the target node and the predicted future location of the apparatus.

18. The tangible, non-transitory computer-readable media comprising program instructions as in claim 17, wherein the process when executed is further configured to:

associate a confidence value with the data indicative of the future location of the target node, wherein the apparatus is configured to forward the packet based in part on the confidence value associated with the data.

19. The tangible, non-transitory computer-readable media comprising program instructions as in claim 18, wherein the confidence value is determined using fuzzy logic.

20. The tangible, non-transitory computer-readable media comprising program instructions as in claim 16, wherein the process when executed is further configured to:

notify the neighbor that the apparatus will forward the packet, based on the determination that the apparatus has a higher likelihood of the packet being received by the target node were the packet forwarded by the process to the target node than were the packet forwarded by the neighbor to the target node.

* * * * *